(12) United States Patent
Lee et al.

(10) Patent No.: US 10,678,305 B1
(45) Date of Patent: Jun. 9, 2020

(54) DISPLAY DEVICE

(71) Applicant: LG Display Co., Ltd., Seoul (KR)

(72) Inventors: Shin-Suk Lee, Gimpo-si (KR);
Seung-O Jeon, Seoul (KR);
Young-Joon Yun, Paju-si (KR);
Hyeong-Gwang An, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/562,399

(22) Filed: Sep. 5, 2019

(30) Foreign Application Priority Data

Nov. 22, 2018 (KR) .................. 10-2018-0145000

(51) Int. Cl.
*H05K 1/00* (2006.01)
*G06F 1/16* (2006.01)
*H04M 1/02* (2006.01)
(52) U.S. Cl.
CPC .......... *G06F 1/1652* (2013.01); *G06F 1/1641* (2013.01); *G06F 1/1681* (2013.01); *H04M 1/0268* (2013.01)
(58) Field of Classification Search
USPC ....................................................... 361/749
See application file for complete search history.

(56) References Cited

U.S. PATENT DOCUMENTS

| 6,223,393 | B1 | 5/2001 | Knopf | |
|---|---|---|---|---|
| 2005/0141186 | A1* | 6/2005 | Shimizu | G02F 1/133308 |
| | | | | 361/679.02 |
| 2015/0233162 | A1* | 8/2015 | Lee | H04M 1/02 |
| | | | | 16/223 |
| 2018/0329460 | A1 | 11/2018 | Song | |

FOREIGN PATENT DOCUMENTS

WO   WO 2018/194605 A1   10/2018

OTHER PUBLICATIONS

European Patent Office, Extended European Search Report and Opinion, EP Patent Application No. 19203755.4, dated Mar. 26, 2020, eight pages.

\* cited by examiner

*Primary Examiner* — Andargie M Aychillhum
(74) *Attorney, Agent, or Firm* — Fenwick & West LLP

(57) ABSTRACT

A display device includes first and second set frames disposed adjacent to each other, a panel disposed above the first and second set frames, and a folding hinge disposed between the first set frame and the second set frame. The folding hinge includes a plurality of segmented members, the plurality of segmented members including at least a first segmented member having a first protrusion shaft and a second segmented member having a first groove movably coupled to the first protrusion shaft.

16 Claims, 5 Drawing Sheets

DISPLAY DEVICE

CROSS-REFERENCE TO RELATED APPLICATION

This application claims priority to Republic of Korea Patent Application No. 10-2018-0145000, filed on Nov. 22, 2018, which is incorporated by reference in its entirety for all purposes.

BACKGROUND

Field of Technology

The present disclosure relates to a display device, and more particularly, to a foldable display device.

Discussion of the Related Art

In the recent information society, importance of a display device or a display has been emphasized as a visual information delivery medium. In order to take a leading place in the future, it is necessary to satisfy requirements such as low power consumption, thinness, light weight, and high image quality.

A display may be divided into an emissive display, which can emit light by itself, such as a cathode ray tube (CRT), an electroluminescent (EL) device, a light emitting diode (LED), a vacuum fluorescent display (VFD), a field emission display (FED), a plasma display panel (PDP), or an organic light emitting diode (OLED); and a non-emissive display, which cannot emit light by itself, such as a liquid crystal display (LCD).

Meanwhile, with progress of technology, instead of a glass substrate without flexibility applied to an existing display, a flexible display device manufactured using a flexible material such as plastic to maintain display performance even when the display device is bent (e.g., like paper) is rapidly emerging as a next-generation display device.

The flexible display device may be divided into an unbreakable type, a bendable type, a rollable type, and a foldable type with high durability using a plastic thin-film transistor substrate instead of glass. Such a flexible display device is advantageous in space usage, interior decoration, and design, and has various application fields.

In particular, in recent years, in order to realize a large area along with ultra-thinness, light weight, and downsizing, foldable display devices capable of being carried in a folded state and displaying an image in an unfolded state have been actively studied.

The foldable display devices are applicable not only to mobile devices such as mobile phones, ultra-mobile personal computers (PCs), electronic books, or electronic newspapers, but also to various other devices such as TVs or monitors.

A foldable display device may include a hinge mechanism for enabling folding and unfolding.

A generally used hinge mechanism uses a multi-link hinge having various structures including a chain or a 2-axis folding hinge connected to a central body including two hinge shafts.

However, since such a hinge mechanism has a stepped portion or a discontinuous exposure structure to enable folding and unfolding operation, a panel or an internal structure may be damaged by shock.

SUMMARY

Accordingly, embodiments of the present invention are directed a display device that substantially obviates one or more problems due to limitations and disadvantages of the related art.

An object of the present invention is to provide a foldable display device capable of minimizing or reducing a stepped portion of an exposed portion without using a hinge pin and ensuring sufficient durability against external load.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device includes a first set frame and a second set frame disposed adjacent to each other, a panel disposed above the first and second set frames, and a folding hinge disposed between the first set frame and the second set frame. The folding hinge includes a plurality of segmented members, the plurality of segmented members including at least a first segmented member having a first protrusion shaft and a second segmented member having a first groove movably coupled to the first protrusion shaft.

The first protrusion shaft may be inclined laterally downward, and the first groove may be inclined laterally upward.

The folding hinge may further include a third segmented member having a second protrusion shaft, wherein the first segmented member further includes a second groove.

The first segmented member may include a first main body extending in a longitudinal direction, wherein the first protrusion shaft protrudes from one side of the first main body while extending in the longitudinal direction, and wherein the second groove is recessed from the other side of the first main body while extending in the longitudinal direction. The folding hinge may bend about a folding axis to change the display device from one of a folded state and an unfolded state to the other. The folding axis may be in the longitudinal direction.

The second segmented member may include a second main body extending in the longitudinal direction, wherein the first groove is recessed from one side of the second main body while extending in the longitudinal direction and rotatably engaged with the first protrusion shaft of the first segmented member.

The third segmented member may include a third main body extending in the longitudinal direction, wherein the second protrusion shaft protrudes from one side of the third main body while extending in the longitudinal direction and rotatably engaged with the second groove of the first segmented member.

The folding hinge may include the second segmented member connected to the first set frame, the third segmented member connected to the second set frame, and a plurality of first segmented members connected between the second segmented member and the third segmented member.

The second segmented member may further include a first connector extending from the other side of the second main body and coupled with the first set frame.

The third segmented member may further include a second connector extending from the other side of the third main body and coupled with the second set frame.

The display device may further include a plurality of side covers each coupled to a side surface of a corresponding one of the plurality of segmented members.

Each of the plurality of side covers may include a first block in contact with the side surface of the corresponding one of the plurality of segmented members, and a second block obliquely disposed outside the first block.

The first protrusion shaft may include a key groove recessed from a side surface thereof, and the first block of the first segmented member may include a protrusion key fitted into the key groove and a roof surrounding an upper region of the first segmented member.

The plurality of segmented members may be formed of a metal material and the plurality of side covers may be formed of a plastic material.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
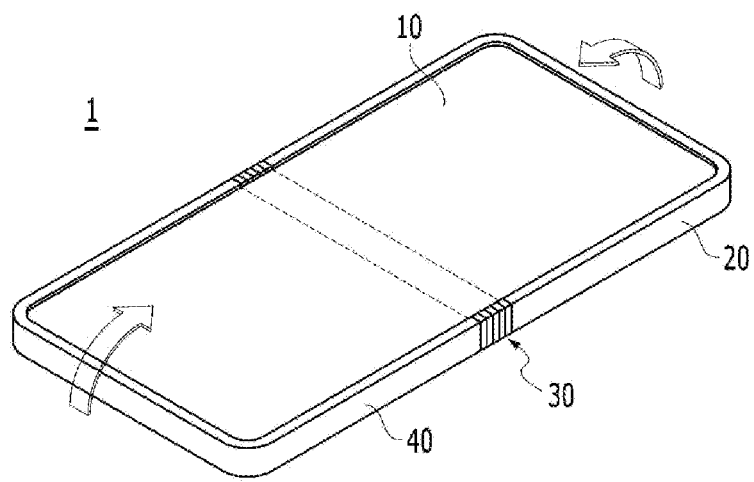
FIG. 1 is a view showing an unfolded state of a general foldable display device including a chain hinge.

Hereinafter, embodiments will be become more apparent from the accompanying drawings and the description of the embodiments. In the description of the embodiments, it will be understood that, when an element such as a layer (film), region, pattern or structure is referred to as being formed "on" or "under" another element, such as a substrate, layer (film), region, pad or pattern, it can be directly "on" or "under" the other element or be indirectly formed with intervening elements therebetween. It will also be understood that "on" and "under" the element is described relative to the drawings.

In the drawings, dimensions may be exaggerated, omitted or schematically illustrated, for convenience and clarity of description. In addition, the size of each component does not entirely reflect the actual size necessarily. The same reference numbers will be used throughout the specification to refer to the same or like constituent elements. Hereinafter, embodiments will be described with reference to the accompanying drawings.

Figure 2:
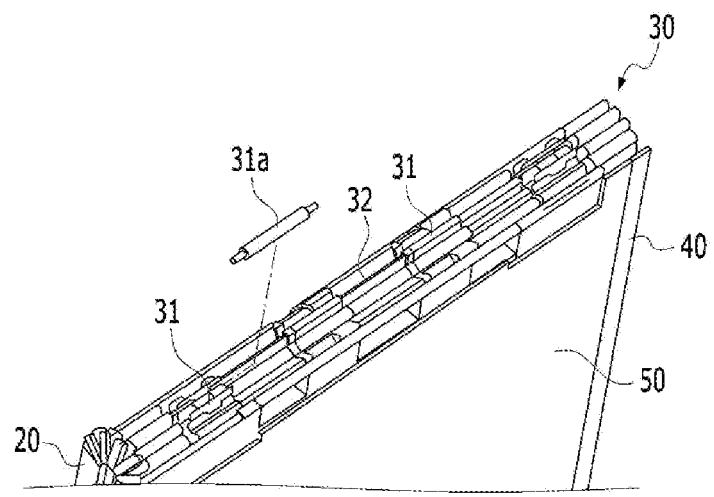
FIG. 2 is a view showing a chain hinge in a folded state of the foldable display device of FIG. 1.

FIG. 1 is a view showing an unfolded state of a general foldable display device including a chain hinge, and FIG. 2 is a view showing a chain hinge in a folded state of the foldable display device of FIG. 1.

Referring to FIGS. 1 and 2, the general foldable display device 10 having a chain hinge as a hinge mechanism is disclosed. The chain hinge 30 is located between a first frame 20 and a second frame 40 to support a panel 10, such that folding or unfolding operation of the foldable display device 10 is possible.

Here, the chain hinge 30 is formed by connecting a plurality of chain segments through a hinge pin 31a and has a protrusion region 31 and a recessed region 32, to which the hinge pin 31a is coupled.

However, in such a hinge mechanism, a panel or an internal structure may be damaged when shock is applied to a stepped portion or a discontinuous exposure structure of the protrusion region 31 and the recessed region 32. The discontinuous exposure structure may be due to gaps in the area between connected chain segments.

The present invention may provide the following embodiments in order to solve the above-described problems.

Figure 3:
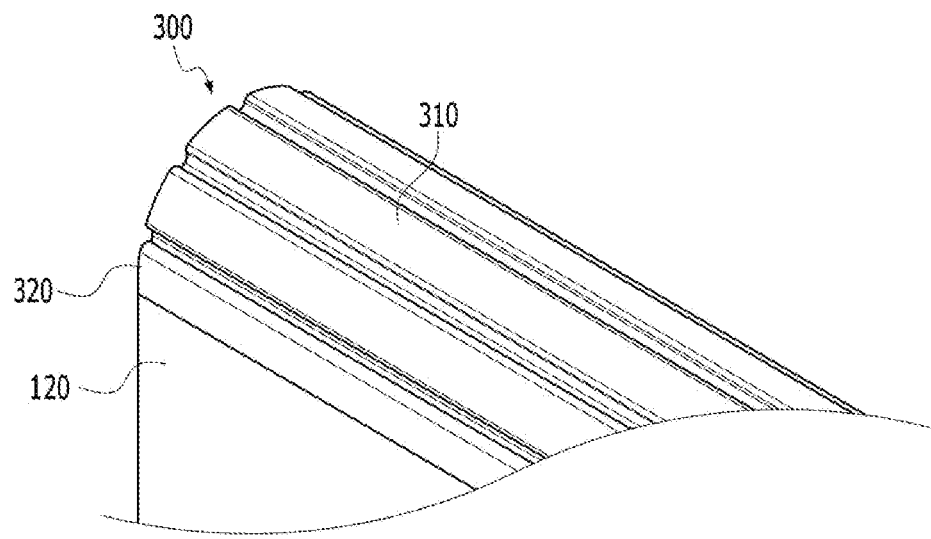
FIG. 3 is a perspective view showing a folding hinge in a display device according to an embodiment of the present invention.
Figure 4:
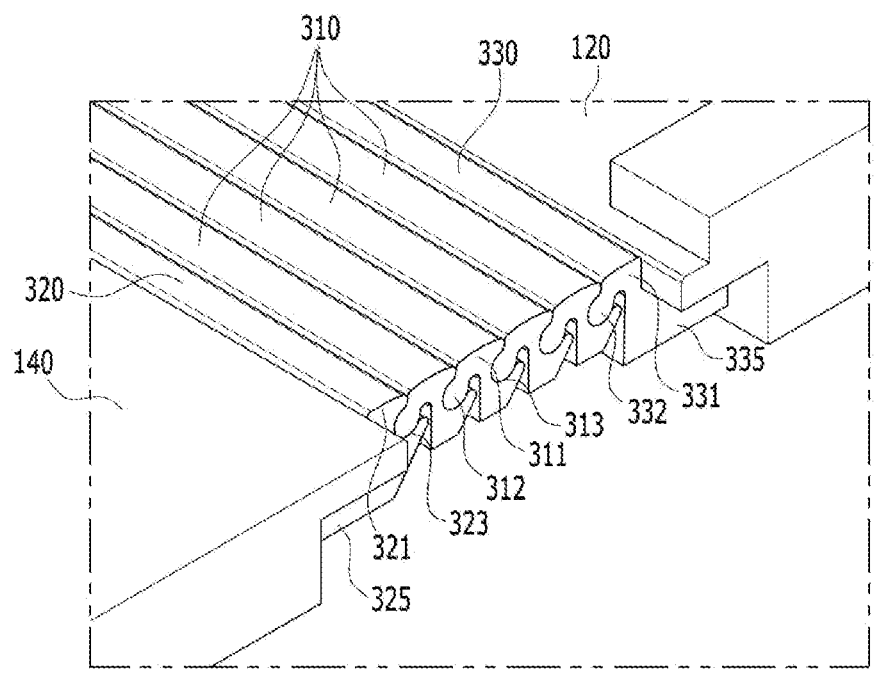
FIG. 4 is a view showing an unfolded state of the folding hinge of FIG. 3.
Figure 5:
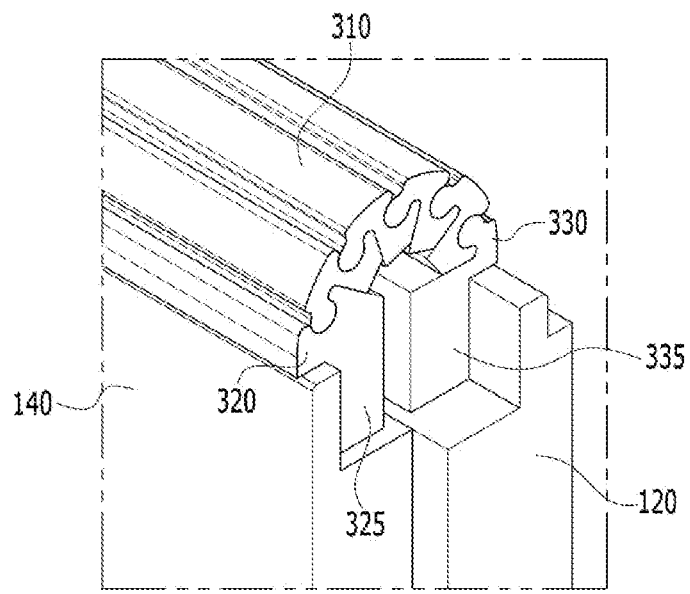
FIG. 5 is a view showing a folded state of the folding hinge of FIG. 3.

FIG. 3 is a perspective view showing a folding hinge in a display device according to an embodiment of the present invention, FIG. 4 is a view showing an unfolded state of the folding hinge of FIG. 3, and FIG. 5 is a view showing a folded state of the folding hinge of FIG. 3.

Referring to FIGS. 3 to 5, the display device according to the embodiment of the present invention includes a first set frame 120, a second set frame 140, and a folding hinge 300.

The first set frame 120 and the second set frame 140 may be disposed adjacent to each other, thereby supporting a panel 10. For example, the first set frame 120 may be located inside a first frame 20 (see FIG. 1) and the second set frame 140 may be disposed inside a second frame 40 (see FIG. 1).

The panel 10 includes a display region in which an image is displayed by a pixel array having a plurality of pixels. The display region may include a first display region in which the first set frame 120 is located, a second display region in which the second set frame 140 is located, and a bending region.

The first set frame 120 may be disposed adjacent to the second set frame 140 with the bending region interposed therebetween. The bending region may be defined between the first display region and the second display region of the panel 10. The bending region may be unfolded in a planar state or bent in a curved shape with a predetermined radius of curvature, according to the folded/unfolded state.

The first frame 20 may support or accommodate various parts (e.g., the first set frame 120) corresponding to the first display region of the panel 10, and the second frame 40 may support or accommodate various parts (e.g., the second set frame 140) corresponding to the second display region of the panel 10.

Selectively, the first display region and the second display region may have, without being limited to, the same size, and any one thereof may have a larger size. In this case, when the panel 10 is folded, a portion of the display region having a relatively large size may be exposed to the outside, and a date, a time, a battery residual value, and/or a notification may be continuously displayed in the portion of the display region exposed to the outside even when at least one other functionality or component of the display device is turned off.

Here, the panel 10 may be a flexible organic light emitting display panel, a flexible electrophoretic display panel, a flexible electrowetting display panel, or a flexible quantum dot display panel.

In some embodiments, the panel 10 may be located above the first set frame 120 and the second set frame 140, and may be located outside the first set frame 120 and the second set frame 140 in the folded state. Of course, as necessary in other embodiments, the panel 10 may be disposed below the first set frame 120 and the second set frame 140 so as to be located inside the first set frame 120 and the second set frame 140. In some embodiments, panels 10 may be located inside and outside the frames in the folded state or only one panel may be located inside or outside the frames.

Here, folding may be defined as including folding or unfolding of the bending region and may be implemented using the folding hinge 300.

The folding hinge 300 may be disposed between the first set frame 120 and the second set frame 140.

The folding hinge 300 has a structure in which a plurality of segmented members including at least segmented members 310, 320, and 330 is continuously connected and may be configured to be in a folded or unfolded state, thereby implementing pivoting operation between the segmented members 310, 320, and 330 without using a conventional hinge pin. In embodiments of the present invention, "continuously connected" may also refer to the direct connection of the plurality of segmented members without using other connection parts. Directly connected segmented members have direct physical contact with each other without any intervening members. When segmented members of the plurality of segmented members are continuously connected with each other, they can form a substantially flat or smooth upper surface, e.g., as shown in FIG. 4. In moving the display device from one of the folded state and the unfolded state to the other, the folding hinge 300 bends about a folding axis (e.g., in a longitudinal direction). When the folding hinge 300 bends, each of the segmented members rotates relative to one or more adjacent segmented members.

Here, the segmented members 310, 320, and 330 may be referred to as units, segments, chain hinge segments, chain segments, hinge segments, etc. In some embodiments, the segmented members 310, 320, and 330 may be formed of a metal material.

Each of the segmented members 310, 320, and 330 may include at least one protrusion shaft and/or groove movably receiving a protrusion shaft. In the embodiment shown in FIG. 4, the segmented members 310 each include a protrusion shaft 312 and a groove 313. The segmented member 330 includes a protrusion shaft 332 and does not include a groove. The segmented member 320 includes a groove 323 and does not include a protrusion shaft. Each segmented member may be coupled to at least one of the other segmented members 310, 320, and 330 adjacent thereto. The protrusion shafts 312 and 332 may be referred to as rotation shafts, hinge shafts, or pivoting shafts, and the grooves 313 and 323 may be referred to as rotation grooves, hinge grooves, or pivoting grooves.

The segmented members 310, 320, and 330 may extend in a longitudinal direction (e.g., a direction of a folding axis). Here, for example as shown in FIG. 5, the protrusion shafts 312 and 332 of the segmented members 310 and 330 may be inclined laterally downward and the grooves 313 and 323 may be inclined laterally upward. An angle of the inclined protrusion shafts may be equal to or otherwise correspond to an angle of the inclined grooves.

For example, the segmented members 310, 320, and 330 include a total of three types of segmented members, that is, a first segmented member 310, a second segmented member 320, and a third segmented member 330.

The first segmented member 310 has the protrusion shaft 312 and the groove 313, the second segmented member 320 has the groove 323, and the third segmented member 330 has the protrusion shaft 332.

More specifically, the first segmented member 310 may include a main body 311, a first protrusion shaft 312, and a first groove 313.

The first main body 311 forms the main body of the first segmented member 310, and the upper surface thereof is flat in the longitudinal direction and is rounded (curved) toward both edges thereof.

The first protrusion shaft 312 may protrude from one side (e.g., the left side of FIG. 4) of the first main body 311 while extending in the longitudinal direction. The first protrusion shaft 312 may be inclined laterally downward (e.g., by 45° in the left downward direction), as described above, and an end thereof may have a circular or round side cross-section.

The first groove 313 may be recessed from the other side (e.g., the right side of FIG. 4) of the first main body 311 while extending in the longitudinal direction. The first groove 313 may be inclined laterally upward (e.g., by 45° in the right upward direction), as described above. In some embodiments, the first groove 313 may have a shape of an arc larger than a semicircle such that the protrusion shaft 312 is not detached even when the protrusion shaft 312 is rotated in a state of being fitted. In other words, a groove 313 and a protrusion shaft 312 may remain interlocked together without using another component.

The second segmented member 320 has a second main body 321 extending in the longitudinal direction. In addition, the second segmented member 320 may include a second groove 323 recessed from the other side (e.g., the right side of FIG. 4) of the second main body 321 while extending in the longitudinal direction. The second groove 323 may have the same shape as the first groove 313.

The third segmented member 330 has a third main body 331 extending in the longitudinal direction. In addition, the third segmented member 330 may include a third protrusion shaft 332 protruding from one side of the third main body 331 while extending in the longitudinal direction and rotatably engaged with the first groove 313. The third protrusion shaft 332 may have the same shape as the first protrusion shaft 312.

The folding hinge 300 including at least the first segmented member 310, the second segmented member 320, and the third segmented member 330 may include one second segmented member 320, one third segmented member 330 and a plurality of first segmented members 310. The plurality of first segmented members 310 may be disposed between the second segmented member 320 and the third segmented member 330.

Here, the second segmented member 320 may be connected to the first set frame 120 (or the second set frame 140) and the third segmented member 330 may be connected to the second set frame 140 (or the first set frame 120).

To this end, the second segmented member 320 may further include a first connector 325 extending from one side of the second main body 321 and coupled with the first set frame 120 (or the second set frame 140). For example, the first connector 325 may extend to have a shape corresponding to the shape of the first set frame 120 (or the second set frame 140), such that the surface of one side of the second main body 321 is brought into close contact with the first set frame 120 (or the second set frame 140).

The third segmented member 330 may further include a second connector 335 extending from the other side of the third main body 331 and coupled with the second set frame 140 (or the first set frame 120). For example, the second connector 335 may extend to have a shape corresponding to the shape of the second set frame 140 (or the first set frame 120), such that the surface of the other side of the third main body 331 is closely brought into contact with the second set frame 140 (or the first set frame 120).

The display device of the embodiment having the folding hinge 300 including the above-described configuration may perform folding operation while the segmented members 310, 320, and 330 rotate along the protrusion shafts 312 and 332 and the grooves 313 and 323 to a folded state as shown in FIGS. 3 and 5, and perform unfolding operation while the segmented members 310, 320, and 330 are unfolded in a row to an unfolded state as shown in FIG. 4.

Accordingly, in the display device of an embodiment, it is possible to ensure sufficient durability against external load by minimizing or reducing a stepped portion of an exposed portion while a hinge pin is not used in a folding hinge. In addition, it is possible to improve cost and time required for assembly, workability, etc. by simplifying parts of the display device.

Figure 6:
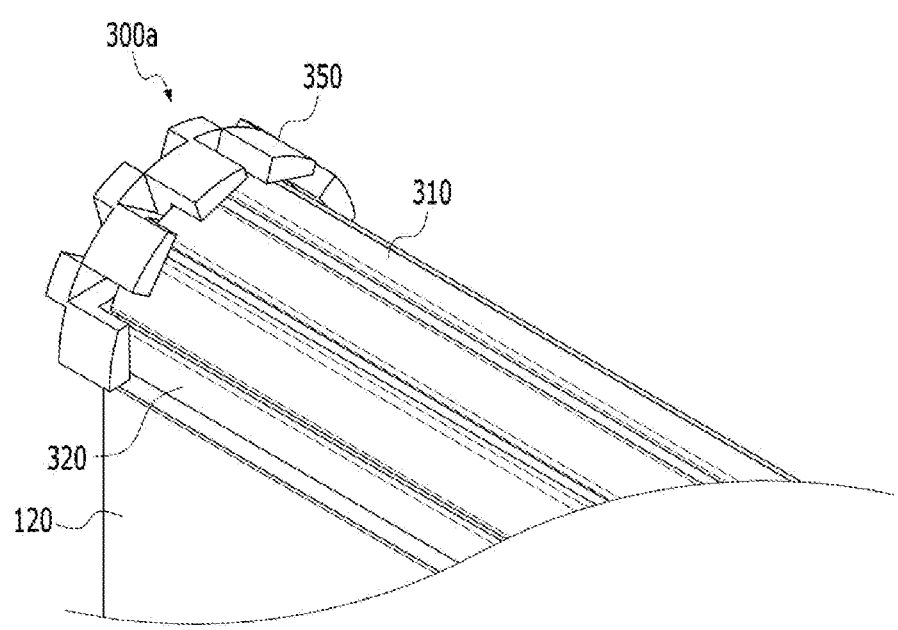
FIG. 6 is a perspective view showing a folding hinge in a display device according to another embodiment of the present invention.
Figure 7:
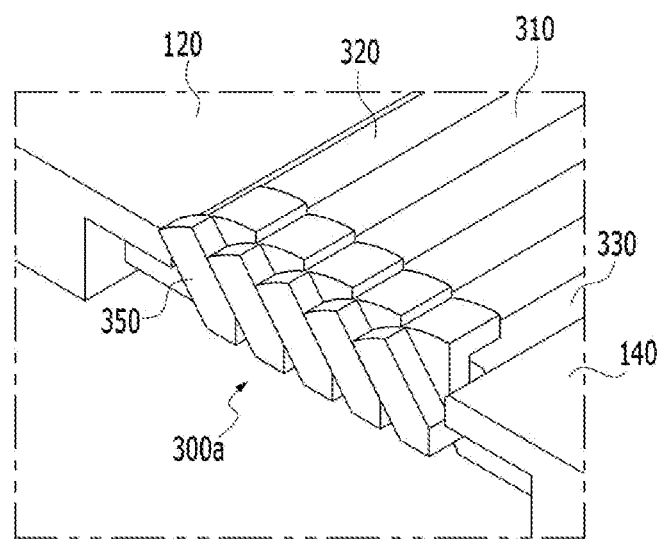
FIG. 7 is a view showing an unfolded state of the folding hinge of FIG. 6.
Figure 8:
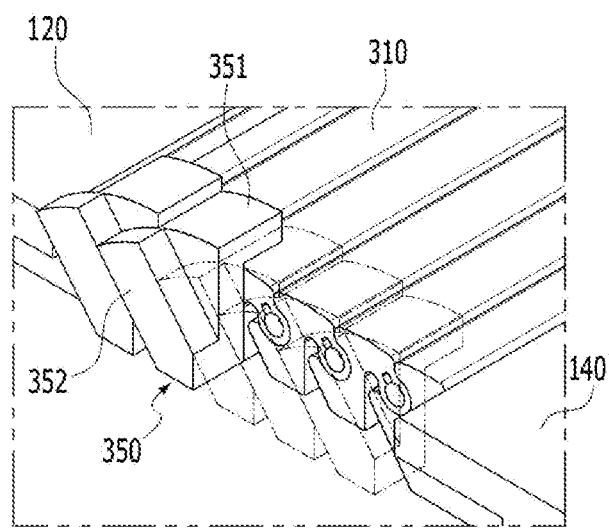
FIG. 8 is a cutaway view of FIG. 7.
Figure 9A:
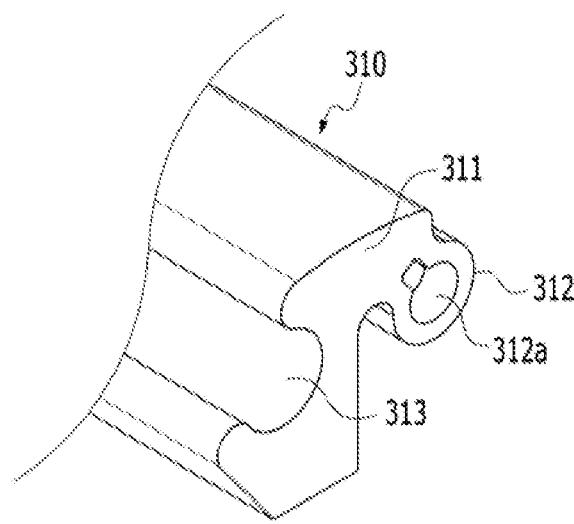
FIG. 9A is a view showing a segmented member and FIG. 9B is a view showing a side cover of the segmented member according to an embodiment.
Figure 9B:
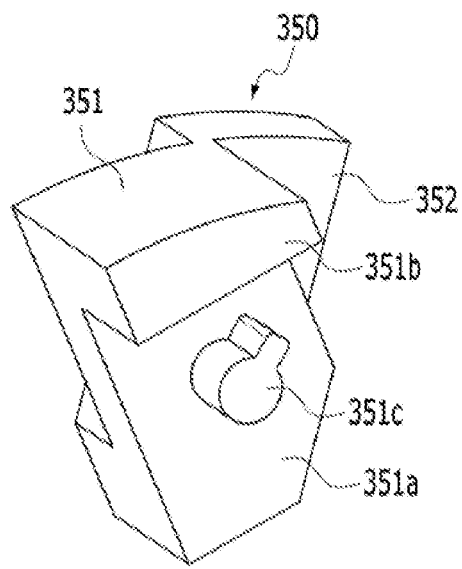

FIG. 6 is a perspective view showing a folding hinge in a display device according to another embodiment of the present invention. FIG. 7 is a view showing an unfolded state of the folding hinge of FIG. 6. FIG. 8 is a cutaway view of FIG. 7. FIG. 9A is a view showing a segmental member and FIG. 9B is a view showing a side cover of the segmented member according to an embodiment.

In the present embodiment, portions and features different from those of the above-described embodiment will be focused upon.

Referring to FIGS. 6 to 9B, the folding hinge 300a according to the present embodiment may further include a side cover 350 coupled to each of the side surfaces of the segmented members 310, 320, and 330 of the above-described folding hinge 300.

The side cover 350 may prevent the panel 10 and, more particularly, the edge of the panel 10, from being damaged by movement of the folding hinge 300a. That is, the side cover 350 may be mounted to each of the segmented members 310, 320, and 330 to cover each of the side surfaces of the segmented members 310, 320, and 330, and may be moved along with movement of the segmented members 310, 320, and 330.

As described above, since the segmented members 310, 320, and 330 may be formed of a metal material, friction with the panel 10 may occur by folding and unfolding operation, thereby causing scratches. Accordingly, the side cover 350 is formed of a plastic material to cover each of the side surfaces of the segmented members 310, 320, and 330, thereby reducing any damage caused when friction with the panel 10 occurs.

For example, the side cover 350 may include a first block 351 and a second block 352.

Each of the first blocks 351 is in contact with the side surface of a corresponding one of the segmented members 310, 320, and 330. The second blocks 352 are obliquely disposed outside a corresponding one of the first blocks 351 to form a portion located outside each of the segmented members 310, 320, and 330. The second blocks 352 may be disposed at an angle relative to the first blocks 351 and/or to a plane of the panel 10 in an unfolded state.

The side covers 350 may be fitted into each of the side surfaces of the segmented members 310, 320, and 330, or may be mounted by an adhesive.

In some embodiments, as shown in FIGS. 8 to 9B, each of the segmented members 310, 320, and 330, and the side cover 350 may include a coupling portion for mutual assembly.

For example, the coupling portion may include a key groove 312a recessed from each of the side surfaces of the protrusion shafts 312 and 332 of the segmented members 310, 320, and 330, and a protrusion key 351c protruding from the first block 351 of each of the side covers 350 and fitted into the key groove 312a of a corresponding one of the segmented members 310, 320 and 330.

The key groove 312a may be recessed from each of the side surfaces of the protrusion shafts 312 and 332 by a certain depth and may have a cross-sectional shape, in which a circle and a rectangle are combined, to correspond to the shape of the protrusion shafts 312 and 332 (as shown in FIGS. 9A-9B). Similarly, the protrusion key 351c may protrude from the contact surface 351a of each of the side covers 350 toward the key groove 312a by a certain height to correspond to the shape the key groove 312a. The contact surface 351a is a surface contacting one of the segmented members 310, 320, and 330.

Accordingly, the side cover 350 and each of the segmented members 310, 320, and 330 may be mutually assembled by the key groove 312a and the protrusion key 351c.

In addition, the first block 351 of the side cover 350 may include a roof 351b surrounding the upper region of a corresponding one of the segmented members 310, 320, and 330 upon being coupled with the corresponding one of the segmented members 310, 320, and 330. Accordingly, the side covers 350 may surround the side surface and the upper surface of each of the segmented members 310, 320, and 330 when being coupled to each of the segmented members 310, 320, and 330, thereby protecting the panel 10.

Accordingly, in embodiments of the display device, it is possible to ensure sufficient durability against external load by minimizing or reducing a stepped portion of an exposed portion of a hinge mechanism using a folding hinge without using a hinge pin. In addition, it is possible to improve cost and time required for assembly, workability, etc. by simplifying parts. In addition, it is possible to stably protect the panel 10 of the display device using the side covers.

The display device according to the embodiments of the present invention is applicable to various electronic apparatuses such as TVs, smartphones, tablet PCs, etc.

Although not shown, the display devices using the folding hinges of the present embodiments are applicable to the other folding structures including a sliding plate and a spring.

According to embodiments of the display device, it is possible to ensure sufficient durability against external load by minimizing or reducing a stepped portion of an exposed portion of a hinge mechanism using a folding hinge without using a hinge pin. In addition, it is possible to improve cost and time required for assembly, workability, etc. by simplifying parts.

The features, structures, effects, and the like described in the embodiments are included in at least one embodiment of the present invention, and are not necessarily limited to only one embodiment. Furthermore, the features, structures, effects, and the like illustrated in the embodiments can be combined and modified by those skilled in the art, to which the embodiments pertain. Accordingly, such combinations and modifications are construed as being within the scope of the present invention.

What is claimed is:

1. A display device comprising:
   a first set frame and a second set frame disposed adjacent to each other;
   a panel disposed above the first and second set frames; and
   a folding hinge disposed between the first set frame and the second set frame;
   wherein the folding hinge includes a plurality of segmented members, the plurality of segmented members including at least a first segmented member having a first protrusion shaft and a second segmented member having a first groove movably coupled to the first protrusion shaft;
   wherein the first protrusion shaft is inclined laterally downward;
   wherein the first groove is inclined laterally upward;
   wherein the folding hinge further includes a third segmented member having a second protrusion shaft;
   wherein the first segmented member further includes a second groove;
   wherein the first segmented member includes a first main body extending in a longitudinal direction;
   wherein the first protrusion shaft protrudes from one side of the first main body while extending in the longitudinal direction;
   wherein the second groove is recessed from the other side of the first main body while extending in the longitudinal direction; and
   wherein the folding hinge bends about a folding axis to change the display device from one of a folded state and an unfolded state to the other, and the folding axis is in the longitudinal direction.

2. The display device of claim 1, wherein the folding hinge includes:
   the second segmented member connected to the first set frame;
   the third segmented member connected to the second set frame; and
   a plurality of first segmented members connected between the second segmented member and the third segmented member.

3. The display device of claim 2, wherein the plurality of first segmented members are located at a middle portion of the folding hinge, the second segmented member is located at one end portion of the folding hinge, and the third segmented member is located at the other end portion of the folding hinge.

4. The display device of claim 1, wherein the second segmented member further includes a first connector extending from the other side of the second main body and coupled with the first set frame.

5. The display device of claim 1, wherein the second segmented member includes:
   a second main body extending in the longitudinal direction;
   wherein the first groove is recessed from one side of the second main body while extending in the longitudinal direction and rotatably engaged with the first protrusion shaft of the first segmented member.

6. The display device of claim 5, wherein the third segmented member includes:
   a third main body extending in the longitudinal direction;
   wherein the second protrusion shaft protrudes from one side of the third main body while extending in the longitudinal direction and rotatably engaged with the second groove of the first segmented member.

7. The display device of claim 6, wherein the third segmented member further includes a second connector extending from the other side of the third main body and coupled with the second set frame.

8. The display device of claim 7, further comprising a plurality of side covers each coupled to a side surface of a corresponding one of the plurality of segmented members.

9. The display device of claim 8, wherein each of the plurality of side covers includes:
   a first block in contact with the side surface of the corresponding one of the plurality of segmented members; and
   a second block obliquely disposed outside the first block.

10. The display device of claim 9,
    wherein the first protrusion shaft includes a key groove recessed from a side surface thereof, and
    wherein the first block of the first segmented member includes a protrusion key fitted into the key groove and a roof surrounding an upper region of the first segmented member.

11. The display device of claim 8, wherein the plurality of segmented members are formed of a metal material and the plurality of side covers are formed of a plastic material.

12. The display device of claim 1, wherein an end portion of the first protrusion shaft has a circular side cross-section.

13. The display device of claim 12, wherein the first groove has a shape of an arc larger than a semicircle in order to accommodate the end portion of the first protrusion shaft.

14. A display device comprising:
    a first set frame and a second set frame disposed to be side by side with each other;
    a panel disposed above the first and second set frames; and
    a folding hinge disposed between the first set frame and the second set frame;
    wherein the folding hinge includes a plurality of segmented members continuously connected with each other to configure a structure that is capable of folding and unfolding, without using any hinge pin in the folding hinge, wherein each of the plurality of segmented members includes:
      at least one of a protrusion shaft or a groove movably receiving another protrusion shaft;
      a first segmented member having a first protrusion shaft and a first groove;
      a second segmented member having a second groove; and
      a third segmented member having a second protrusion shaft.

15. The display device of claim 14, wherein the plurality of segmented members includes:
    a plurality of first segmented members connected between the second segmented member and the third segmented member, wherein the second segmented member is connected to the first set frame and the third segmented member is connected to the second set frame.

16. The display device of claim 14, further comprising a plurality of side covers each coupled to a side surface of a corresponding one of the plurality of segmented members.

* * * * *